United States Patent
Kantecki et al.

(10) Patent No.: US 12,413,388 B2
(45) Date of Patent: Sep. 9, 2025

(54) METHODS AND APPARATUS TO HASH DATA

(71) Applicant: Intel Corporation, Santa Clara, CA (US)

(72) Inventors: Tomasz Kantecki, Ennis (IE); Wei Li, Shanghai (CN); Wajdi Feghali, Boston, MA (US); James Guilford, Northborough, MA (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 17/547,018

(22) Filed: Dec. 9, 2021

(65) Prior Publication Data

US 2022/0103345 A1 Mar. 31, 2022

(51) Int. Cl.
*H04L 29/06* (2006.01)
*H04L 9/06* (2006.01)

(52) U.S. Cl.
CPC .......... *H04L 9/0643* (2013.01); *H04L 9/0618* (2013.01)

(58) Field of Classification Search
CPC ... H04L 9/0643; H04L 9/0618; H04L 9/3236; H04L 9/3239; H04L 9/3242; H04L 63/12; H04L 63/123; G06F 21/64
See application file for complete search history.

(56) References Cited

U.S. PATENT DOCUMENTS

| | | | | |
|---|---|---|---|---|
| 10,503,510 | B2* | 12/2019 | Wolrich | .......... G09C 1/00 |
| 2014/0019693 | A1* | 1/2014 | Gulley | .......... G06F 21/64 |
| | | | | 711/E12.001 |
| 2022/0303140 | A1* | 9/2022 | Inoue | .......... H04L 9/0643 |

OTHER PUBLICATIONS

Gueron, Shay, and Vlad Krasnov. "Parallelizing message schedules to accelerate the computations of hash functions." Journal of Cryptographic Engineering 2.4 (2012): 241-253. (Year: 2012).*

* cited by examiner

*Primary Examiner* — Malcolm Cribbs
(74) *Attorney, Agent, or Firm* — Compass IP Law PC

(57) ABSTRACT

Methods, apparatus, and software for hashing data. The methods and apparatus employ novel improvements to hash algorithms, such as a SHA-2 hash algorithm to reduce computations and increase performance. In one aspect, calculation of SHA-2 message scheduling and SHA compression operations are separated under which an SHA-2 message schedule is applied to multiple rounds of SHA compression operations over multiple chunks of data for the data item being hashed. In another aspect, the SHA-2 message schedule is implemented such that message schedules for multiple message words or data blocks are performed in parallel. The approaches may be employed to reduce hash calculations for various purposes, including generating Filecoin nodes.

17 Claims, 12 Drawing Sheets

```
1.  // SIMD registers MSG0, MSG1, MSG2 and MSG3 – 4 x 128-bits of the message (16 x 32-bits)
2.  // - all operations below are 128-bit operations, 4 x 32-bits 3.  W_i15 = _mm_alignr_epi8(MSG1, MSG0, 4); // get [W[i-15] | W[i-14] | W[i – 13] | W[i – 12]] vector
4.  S0 = _mm_xor_epi32(_mm_ror_epi32(W_i15, 7), _mm_ror_epi32(W_i15, 18));
5.  S0 = _mm_xor_epi32(_mm_srli_epi32(W_i15, 3), S0);
6.  NEW_MSG0 = _mm_add_epi32(MSG0 /* W[i-16] */, S0);

7.  W_i2 = _mm_maskz_shuffle_epi32(0x3, MSG3, 0x4e); // moves W[14] & W[15] position index 0 and 1 of the SIMD,
    the rest of the register is zeroed
8.  S1 = _mm_xor_epi32(_mm_ror_epi32(W_i2, 17), _mm_ror_epi32(W_i2, 19));
9.  S1 = _mm_xor_epi32(_mm_srli_epi32(W_i2, 10), S1);
10. NEW_MSG0 = _mm_add_epi32( NEW_MSG0, S1);
11. NEW_MSG0 = _mm_add_epi32( NEW_MSG0, _mm_alignr_epi8(MSG3, MSG2, 4) /* W[i-7] */);

12. // NEW_MSG0 includes 2x32 bits of message schedule
```

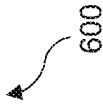

Fig. 6

METHODS AND APPARATUS TO HASH DATA

CROSS-REFERENCE TO RELATED APPLICATIONS

This application claims the benefit of priority to Patent Cooperation Treaty (PCT) Application No. PCT/CN2021/129745 filed Nov. 10, 2021. The entire content of that application is incorporated by reference.

BACKGROUND INFORMATION

Applications such as Filecoin, and more broadly applications related to distributed file systems, crypto currencies, and block-chains rely heavily on cryptographic hash computations such as SHA-256. SHA-256 (and SHA-512) are members of a family of algorithms called SHA-2 (Secure Hash Algorithm 2).

In many of these applications, the compute/resource usage is important to optimize as it directly affects the value of the overall operation. The SHA computations are the main bottlenecks, and in some cases are defined by the application to be calculated sequentially with carefully defined data dependencies, thwarting efforts to parallelize across SIMD (Single Instruction Multiple Data) operations and/or multi-core CPUs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6 is a pseudo code listing illustrating SIMD instructions to calculate an SHA-256 message schedule, according to one embodiment;

DETAILED DESCRIPTION

Figure 1:
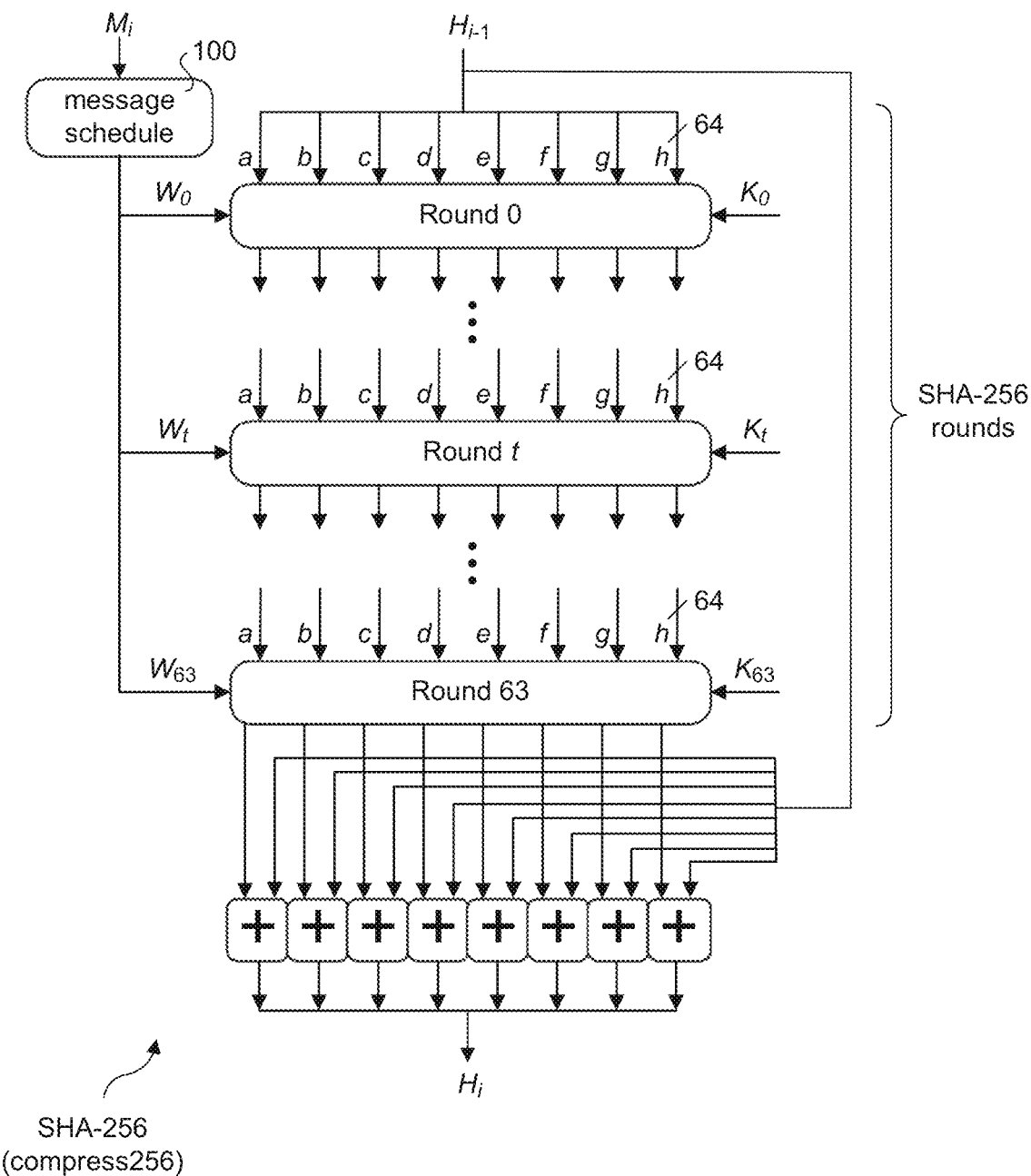
FIG. 1 is a schematic representation of the SHA-256 algorithm applied to a single block or chunk.

Embodiments of methods, apparatus, and software for hashing data are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The process employed by SHA-2 algorithms to calculate the message digest has two phases. Preprocessing of the message (or any data to be compressed) is employed during the first phase to pad it out to a 64 byte multiple with the length of the message embedded in the last 8 bytes. The message is then split into 64 byte (512-bit) blocks (aka chunks) to be processed in the second phase. This second phase is the hash computation, which has two main components itself. One is the message schedule, which takes the 512-bit chunks and expands them into 32-bit dwords (Words) to be processed per round, and the other is the absorption of a given rounds message Word into the working variables. SHA-512 employs a somewhat similar schemed, except the chunks are 1024 bits and the Words are 64 bits.

FIG. 1 shows a schematic representation of the SHA-256 algorithm applied to a single block or chunk. A message schedule 100 provides a message word array $W_0 \ldots W_{63}$ comprising message words that are employed for performing compress operations for each of 64 rounds (Round 0 . . . Round 63). Respective constants $K_0 \ldots K_{63}$) are also provided as inputs to the 64 rounds. The SHA-256 "compress" primitive is applied to each round using the digest from hashing the previous round, generating the digest for the next round. The rounds are also referred to herein as "SHA-256 rounds," and the SHA-256 algorithm is referred to herein as a "compress256" operation.

Figure 2:
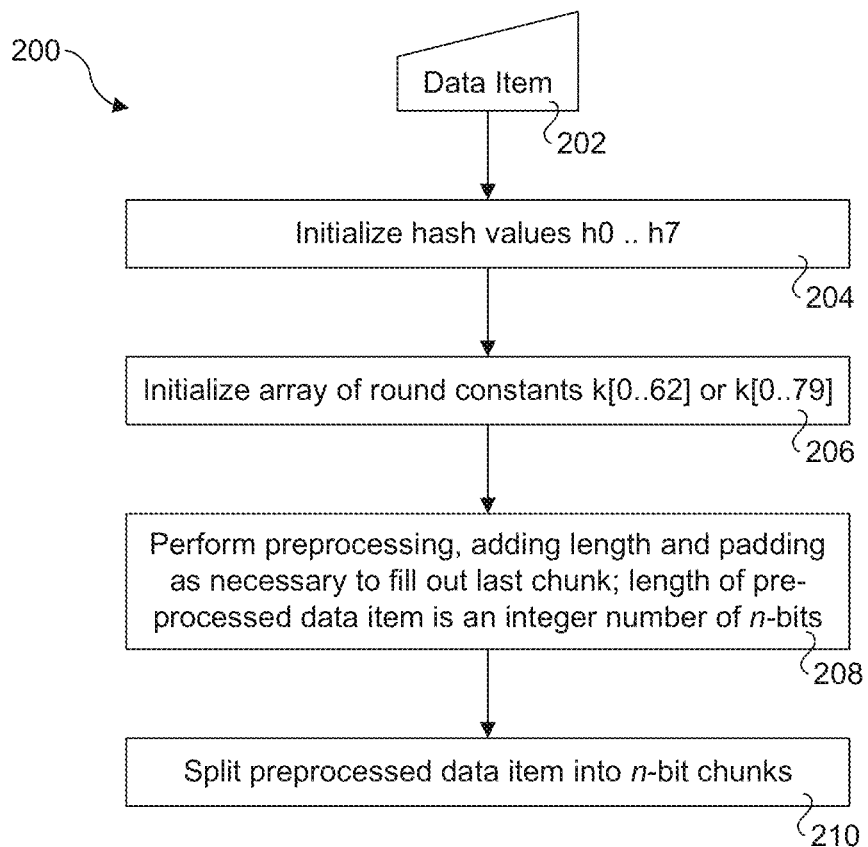
FIG. 2 is a flowchart illustrating operations performed during preprocessing for the SHA-256 and the SHA-512 algorithms.

The preprocessing operations for the SHA-256 and SHA-512 algorithms are shown in a flowchart 200 of FIG. 2. Data item 202 comprises the data to be preprocessed and is provided as an input to a block 204 in which the hash values h0, h1, h2, h3, h4, h5, h6, and h7 are initialized in accordance with the SHA-256 or SHA-512 standard. In a block 206 the array of round constants K[0 . . . 63] for SHA-256 or K[0 . . . 79] for SHA-512 are initialized in accordance with the SHA-256 or SHA-512 standard.

Next, in a block 208 preprocessing is performed. For SHA-256 this begins with the original data (data item 202 in this example), with a length of L bits. A single '1' bit is appended, followed by K '0' bits of padding, wherein K is the minimum number $>=0$ such that L+1+K+64 is a multiple of 512. Length L is then appended as a 64-bit big-endian integer, making the total post-processed length a multiple of 512 bits such that the bits in the message are L 1 00 . . . <K 0's> . . . 00<L as 64 bit integer$>=$m*512 total bits. A similar preprocessing operation is performed for SHA-256 using a multiple of 1024 bits rather than 512 bits. In a block 210, the preprocessed data are then split into m n-bit chunks, were n=512 for SHA-256 and n=1024 for SHA-512.

Figure 3:
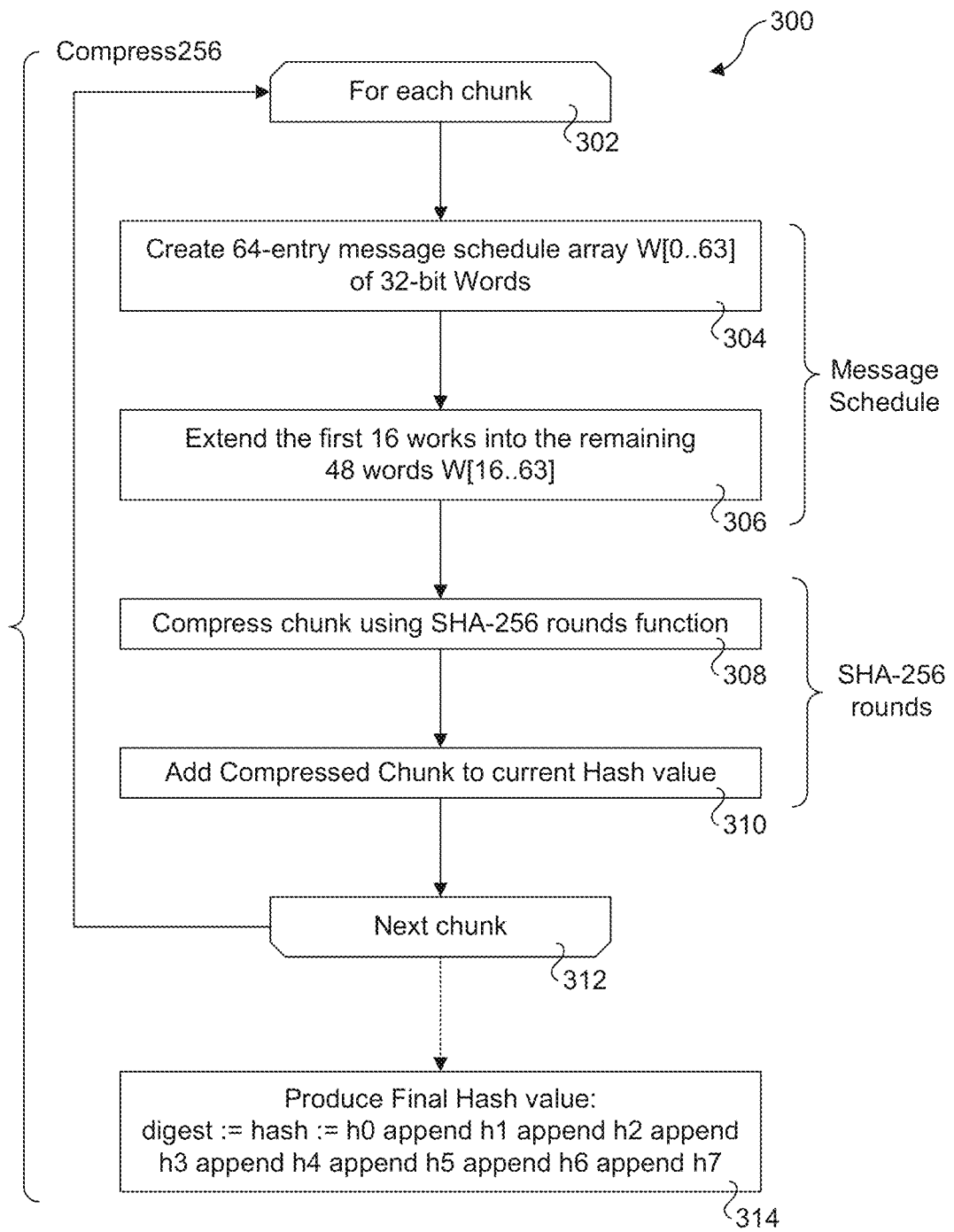
FIG. 3 is a flowchart illustrating operations for performing the SHA-256 algorithm using a conventional approach.

FIG. 3 shows a flowchart 300 illustrating operations for performing the SHA-256 algorithm using a conventional approach. As delineated by a start loop block 302 and an end loop block 312, the operation in blocks 304, 306, 308, and 310 are applied to each 512-bit chunk.

The operations in blocks 304 and 306 are used to generate the messages schedule round for the chunk. This begins with creating a 64-entry message schedule array W[0 . . . 63] of 32-bit words. In a block 306, the first 16 Words are extended in the remaining 48 Words W[16 . . . 63].

Figure 4:
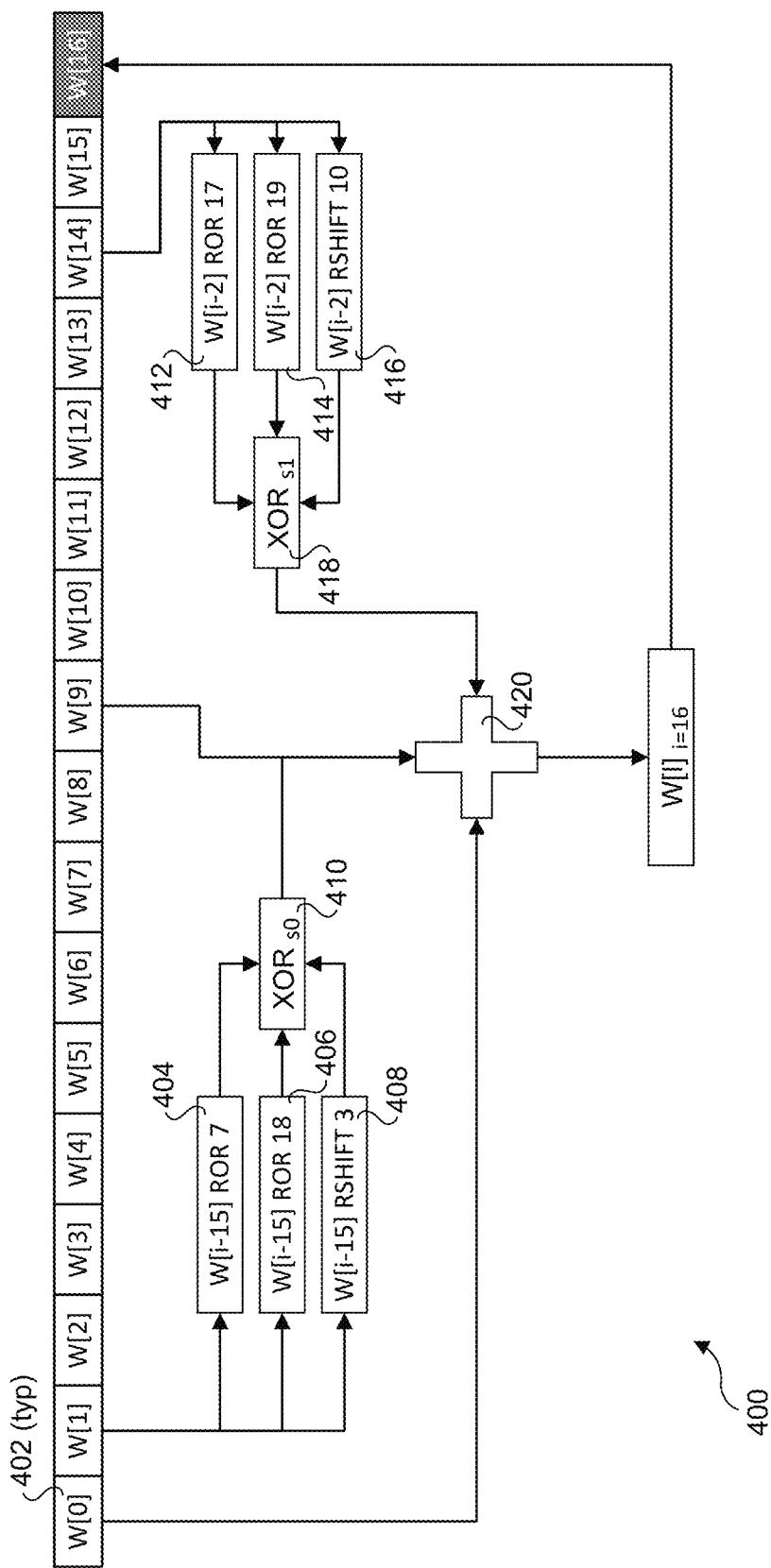
FIG. 4 is a schematic diagram illustrating the conventional approach for calculating an SHA-256 message schedule round for a given 512-bit chunk.

In further detail, the conventional approach for calculating an SHA-256 message schedule round for a given 512-bit chunk is shown in diagram 400 of FIG. 4. For SHA-256, the message schedule includes the σ functions, which use the ROR (rotate right) and SHR (shift right) operations, as shown in the following pseudocode:

```
For i=0 to 63
    If (0 ≤ i ≤ 15)
    W_i = M_i
    Else
    W_i = σ_1(W_{i-2}) + W_{i-7} + σ_0(W_{i-15}) + W_{i-16}
``` where $\sigma_0(W)$ is $ROR_7(W)$ XOR $ROR_{18}(W)$ XOR $SHR_3(W)$ and $\sigma_1(W)$ is $ROR_{17}(W)$ XOR $ROR_{19}(W)$ XOR $SHR_{10}(W)$.

As shown in diagram 400, the input comprises sixteen 32-bit Words (W) 402, labeled W[0], W[1], W[2] . . . W[15]. In a block 404, the bits in each of Word W[i–15] are rotated to the right 7 positions. In a block 406, the bits in Words W[i–15] are rotated to the right 18 positions. In a block 208, Words W[i–15] are shifted to the right 3 positions. The bit outputs of blocks 404, 406, and 410 are bit-wise XORed in an XOR block 410 to produce an s0 value.

Similar operations are performed on the right-hand side. In a block 412, the bits in Words W[i–2] or rotated to the right 17 positions. In a block 414, the bits in Words W[i–2] are rotated to the right 19 positions. In a block 216, Words W[i–2] are shifted to the right 10 positions. The bits outputs of blocks 412, 414, and 216 are bit-wise XORed in an XOR block 218 to produce an s1 value. The integer values from Words W[0] and W[9] and XOR blocks 410 and 418 are then summed to produce an output comprising Word W[16].

The result of the operations illustrated in FIG. 4 is an output W[16]. To calculate the message schedule for the next round, data in blocks W[1], W[2], W[3] . . . [W16] are shifted to the left, replacing W[0] with W[1], W[1] with W[2], etc. Generation of the message schedules for respective rounds is repeated 48 times. There are also 8 operations per message schedule round (one for each of A, B, C, D, E, F, G, and H), resulting in a total of 8×48=384 total calculations.

Following the foregoing, the chunk is then compressed in a block 308 using the SHA-256 rounds function, and the compressed chunk is added to the current hash value in a block 310. Collectively, the operations in blocks 308 and 310 are referred to herein as SHA-256 rounds.

Returning to FIG. 1, The SHA-256 rounds function may be implemented using the following pseudocode:

```
For i=0 to 63
    Temp_1 = H + Σ_1(E) + Ch(E,F,G) + K_i + W_i
    Temp_2 = Σ_0(A) + Maj(A,B,C)
    H = G
    G = F
    F = E
    E = D + Temp_1
    D = C
    C = B
    B = A
    A = Temp_1 + Temp_2
``` where A, B, C, D, E, F, G, and H are the eight 32-bit working variables, K is one of 64 constant values (in K[0 . . . 63]), and $\Sigma 1(\ )$, $\Sigma 0(\ )$, Ch( ), and Maj( ) are logical functions defined by the SHA-256 standard.

Returning to flowchart 300 of FIG. 3, after the SHA rounds are performed on a current chunk, the logic loops back from end loop block 312 to start loop block 302 to being operations on the next chunk. After all the chunks have been processed, the logic proceeds to a block 314 in which the final hash value is calculated. This hash value, also referred to as a digest, comprises amending the current hash values for h0, h1, h2, h3, h4, h5, h6, and h7. The operations performed for calculating the SHA-256 digest are collected referred to herein as a "compress256" operation.

Under both SHA-256 and SHA-512 (as well as all SHA-2 algorithms), the SHA rounds are interdependent on each other, while the message schedule is not. However, current implementations of SHA-256 and SHA-512 do not separate the two.

In accordance with aspects of the novel solution disclosed herein, message schedule calculations are separated from the rounds calculations. In some embodiments, up to 8 rounds of message schedule are calculated in parallel, result in a total of 48 calculations. In some embodiments, SIMD instructions are used. In other embodiments, instructions with SHA extensions are used.

Figure 5:
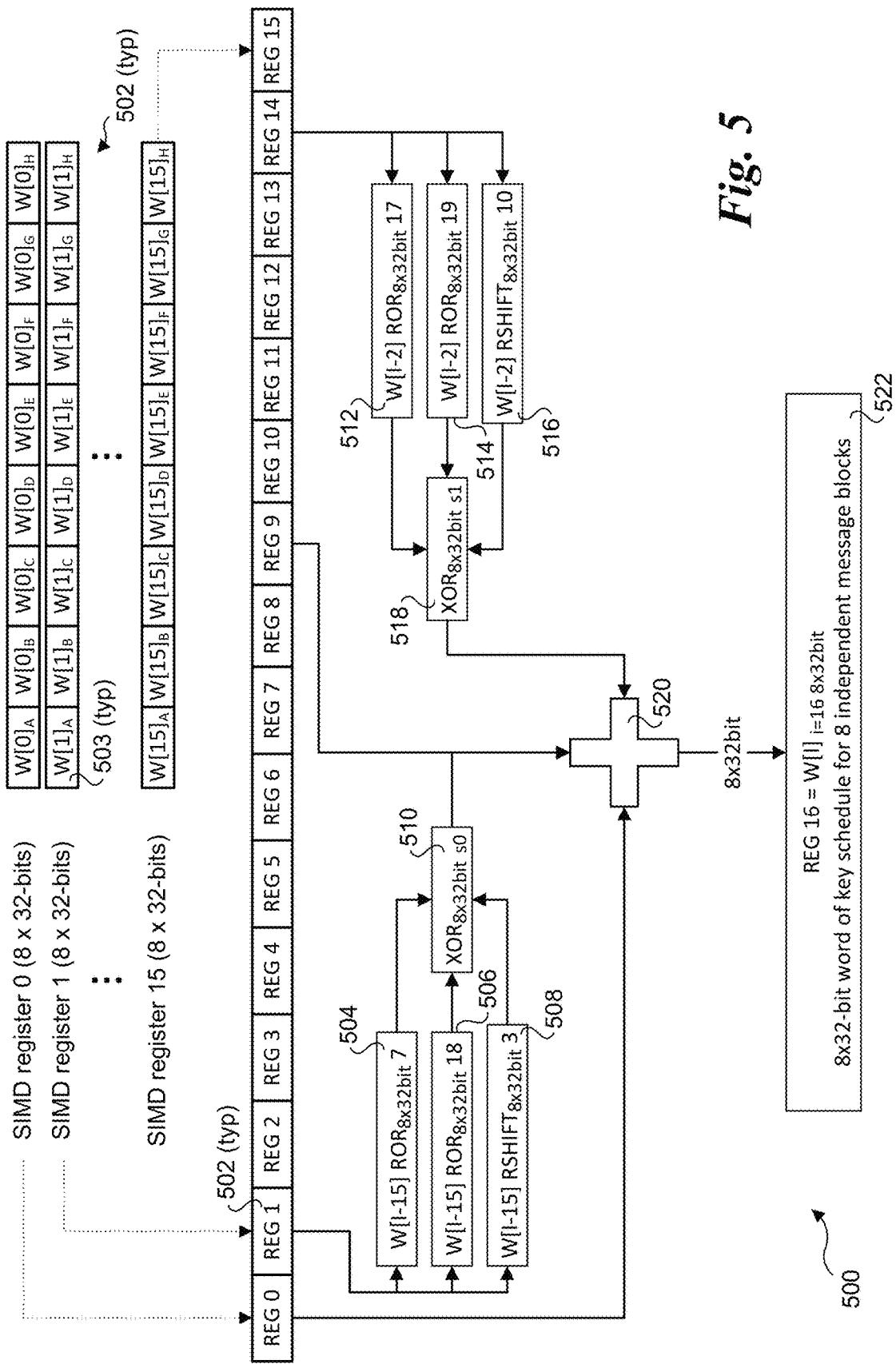
FIG. 5 is a schematic diagram illustrating a novel approach for calculating an SHA-256 message schedule using multiple SIMD registers and SIMD instructions under which message words for independent message blocks are generated in parallel, according to one embodiment.

FIG. 5 shows a diagram 500 illustrating parallel computation of message schedules for 8 rounds using SIMD instructions and SIMD registers. In this example, 16 SIMD registers 502, alternative depicted as REG 0, REG 1, REG 2 . . . REG 15 are used. Each SIMD register 502 is 256-bits wide and logically partitioned into 8 32-bit slots. Each slot stores a respective message Word 503 A, B, C, D, E, F, G, and H for a given message round. For example, SIMD REG 0 stores message Words 503 for round 0: $W[0]_A$, $W[0]_B$, $W[0]_C$, $W[0]_D$, $W[0]_E$, $W[0]_F$, $W[0]_G$, $W[0]_H$.

As depicted by like second and third digits in the reference numbers of FIGS. 4 and 5, the ROR and RSHIFT operations performed in diagram 500 are similar to those shown in diagram 400, except in diagram 500 the inputs are 8 Word values per SIMD register 502 and the operations are performed on these 8 Word values in parallel. For example, consider the ROR operations performed in block 404 of FIG. 4 and block 504 of FIG. 5. As discussed above for block 404, the bits in each of Word W[i−15] are rotated to the right 7 positions. For block 504, this applies to the bits in each of the 8 Words W[1]$_A$, W[1]$_B$, W[1]$_C$, W[1]$_D$, W[1]$_E$, W[1]$_F$, W[1]$_G$, W[1]$_H$. Similarly, in block 506 the bits in the 8 Words W[1]$_A$, W[1]$_B$, W[1]$_C$, W[1]$_D$, W[1]$_E$, W[1]$_F$, W[1]$_G$, W[1]$_H$ are shifted to the right 18 positions, and in block 508 the 8 Words W[1]$_A$, W[1]$_B$, W[1]$_C$, W[1]$_D$, W[1]$_E$, W[1]$_F$, W[1]$_G$, W[1]$_H$ are shifted to the right 3 positions. The 8 outputs from each of blocks 504, 506, and 508 are bitwise XOR'ed in XOR block 510, producing 8×32-bit s0 values.

Similar operations are performed one the right-hand side of diagram 500 using the 8 Words W[14]$_A$, W[14]$_B$, W[14]$_C$, W[14]$_D$, W[14]$_E$, W[14]$_F$, W[14]$_G$, and W[14]$_H$ stored in SIMD REG 14. These include and rotating the bits 17 positions to the right in block 512, rotating the bits 19 positions to the right in block 514, and shifting the 8 Words W[14]$_A$, W[14]$_B$, W[14]$_C$, W[14]$_D$, W[14]$_E$, W[14]$_F$, W[14]$_G$, and W[14]$_H$ 10 positions to the right in a block 516. The 8 outputs from each of blocks 512, 514, and 506 are bitwise XOR'ed in XOR block 518, producing 8×32-bit s1 values.

The integer values for the 8 Words in REG 0 (W[0]$_A$, W[0]$_B$, W[0]$_C$, W[0]$_D$, W[0]$_E$, W[0]$_F$, W[0]$_G$, and W[0]$_H$) plus the integer values of the 8 Words in R 9 (W[9]$_A$, W[9]$_B$, W[9]$_C$, W[9]$_D$, W[9]$_E$, W[9]$_F$, W[9]$_G$, and W[9]$_H$) plus the 8 s0 integer values and the 8 s1 inter values are added for the message Words A, B, C, D, E, F, G, and H, respectively in a summation block 520, yielding 8 output values used to populate REG 16 (W[I]$_{i=16}$), as shown in a block 522.

As before, all the Word blocks are shifted to the left by one position and the indexes are incremented by 1 for each round, with the operations repeated to calculate the values for W[16 . . . 63], resulting in 48 rounds of calculations. However, in this instance, the Words in SIMD registers 502 are shifted in groups of 8 as opposed to shifting individual words.

FIG. 6 shows a pseudo code listing 600 used with the four SIMD registers MSG0, MSG1, MSG2, and MSG3, each having 4×128-bits of the message (16×32-bits). The pseudo code operates as follows, where all operations in lines 3-11 are 128-bit operations, operating on 4×32-bits.

Lines 1 & 2: Starting from index 0 to 3, MSG0 is a register with W[i−16], W[i−15], W[i−14] and W[i−13] 32-bit words, MSG1 is a register with W[i−12], W[i−11], W[i−10] and W[i−9] 32-bit words, MSG2 is a register with W[i−8], W[i−7], W[i−6] and W[i−5] 32-bit words, MSG3 is a register with W[i−4], W[i−3], W[i−2] and W[i−1] 32-bit words.

Line3: W_i15 128-bit SIMD register is loaded with W[i−15], W[i−14], W[i−13] and W[i−12] 32-bit words starting from index 0 to 3, respectively.

Line4: Sigma 0 calculation starts with two 32-bit right rotation operations being performed on W_i15 4×32-bit register content by 7 and 18 bits respectively. The result 4×32-bits of the rotations are subject of exclusive OR operation and then saved into S0 register.

Line5: Sigma 0 calculation continues with 4×32-bit logical shift right on W_i15 by 3 bits. The result of the right shift and current S0 are subject of exclusive OR to complete sigma 0 calculation. Note that S0 index 0 contains Sigma0 32-bit value for W[16] and index 1 for W[17], values at indexes 2 and 3 are irrelevant.

Line6: calculation of two new message schedule words starts here, sigma 0, 4×32-bits S0 and 4×32-bits MSG0 (starting with index 0 it contains W[i−16], W[i−15], W[i−14], W[i−13]) are integer added together.

Line7: W_i2 4×32-bits register is loaded with W[i−2], W[i−1], ZERO and ZERO 32-bit words, starting with index 0 respectively.

Line8: Sigma 1, 51, calculation starts here with two 32-bit right rotation operations being performed on W_i2 4×32-bit register content by 17 and 19 bits respectively. The result 4×32-bits of the rotations are subject of exclusive OR operation and then saved into 51 register.

Line9: Sigma 1, 51, calculation continues with 4×32-bit logical shift right on W_i2 by 10 bits. The result of the right shift and current 51 are subject of exclusive OR to complete sigma 1 calculation. Note that S1 index 0 contains Sigma 1 32-bit value for W[16] and index 1 for W[17], values at indexes 2 and 3 are irrelevant.

Line10: calculation of two new message schedule continues, sigma 1, 4×32-bits S1 is integer added to current message schedule words, NEW_MSG0 4×32-bits.

Line11: the align right operation on MSG3 and MSG2 result in 4×32-bits result W[i−7], W[i−6], W[i−5] and W[i−4], starting with index 0. Integer add then is performed on the result register and current NEW_MSG0 register completing 2 new words of message schedule calculation. Please note that only indexes 0 and 1 of NEW_MSG0 contain valid 32-bit values.

Application to Filecoin

Filecoin is an open-source, public cryptocurrency and digital payment system intended to be a blockchain-based cooperative digital storage and data retrieval method. The Filecoin network is essentially a cloud-based storage system that is operated by its users, rather than a central owner. Filecoin extensively uses SHA-256 hashes for generating new nodes and for other purposes. The Filecoin specification is available at https://spec.filecoin.io/.

Figure 7:
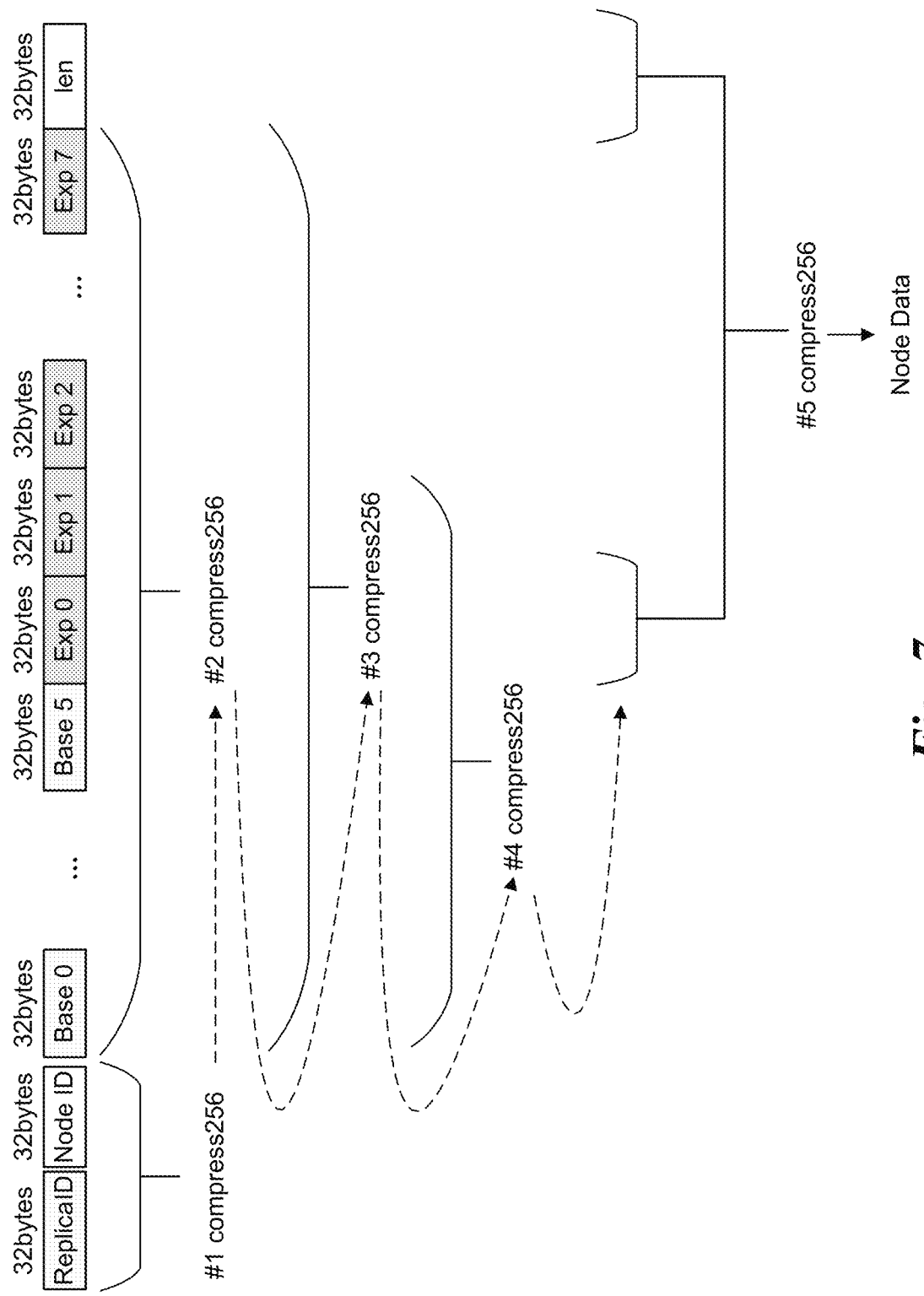
FIG. 7 is a diagram illustrating a conventional scheme for calculating a new "all parents" Filecoin node.

FIG. 7 shows a conventional approach for used by Filecoin for an "all parents" new node compute operation. The data that are operated on comprise seventeen 32-byte blocks, including a ReplicaID block, a Node ID block, six Base blocks Base 0 . . . Base 5, eight Exp (expansion) blocks Exp 0 . . . Exp 7 and a length ('len') block containing padding and a length of 16×32 bytes (512 bytes).

The conventional approach employs five compress256 operations, labeled #1, #2, #3, #4, and #5. Each compress256 operation employs the SHA-256 algorithm using the conventional approach employing the SHA-256 message schedule and the SHA-256 rounds illustrated in FIGS. 1-4 and described above. #1 compress256 operates on the ReplicaID and the NodeID blocks, while #2 compress256 and #3 compress256 operate on the six Base blocks (Base 0 . . . Base 5) and the eight Exp blocks (Exp 0 Exp 7). #4 compress256 operations on the six Base blocks Base 0 . . . Base 5 and the expansion blocks Exp 0 and Exp 1. #5 compress256 operations on Exp 0 and the len block.

Since #1 compress256 and #2 compress256 operate on separate data, they can be performed in parallel, as shown. However, the remaining compress256 operations (#3, #4, and #5) cannot be performed in parallel, since the output of a given compress256 operation is used as the input for the next compress256 operation. This creates a bottleneck, as each compress256 operation is very compute intensive.

Under another aspect of the disclosed embodiments, the novel SHA-256 message schedule scheme described above is used to calculate a SHA-256 message schedule separate from the SHA-256 rounds and is used for multiple iterations of SHA-256 rounds. A first example of this approach is shown in FIG. 8, and operates as follows.

The #1 compress256 operation is performed over the ReplicaID and NodeID blocks, as before, using the conventional SHA-256 algorithm. Conversely, the second operation #2 generates a SHA-256 message schedule for data comprising the six Base blocks and the eight Exp blocks rather than performing a compress256 operation over these blocks. Subsequently, SHA-256 rounds are performed over the six Base parent blocks and the eight Exp parent blocks for operations #3 and #4 using the SHA-256 message schedule generated during operation #2. For operation #5, SHA-256 rounds are performed over blocks Base 0 . . . Base 5, Exp 0, and Exp 1. The overall process is completed using an operation #6 comprising performing a compress256 operation on block Exp 0 and the len block in a manner similar to the compress256 operation #5 in FIG. 7.

Figure 8:
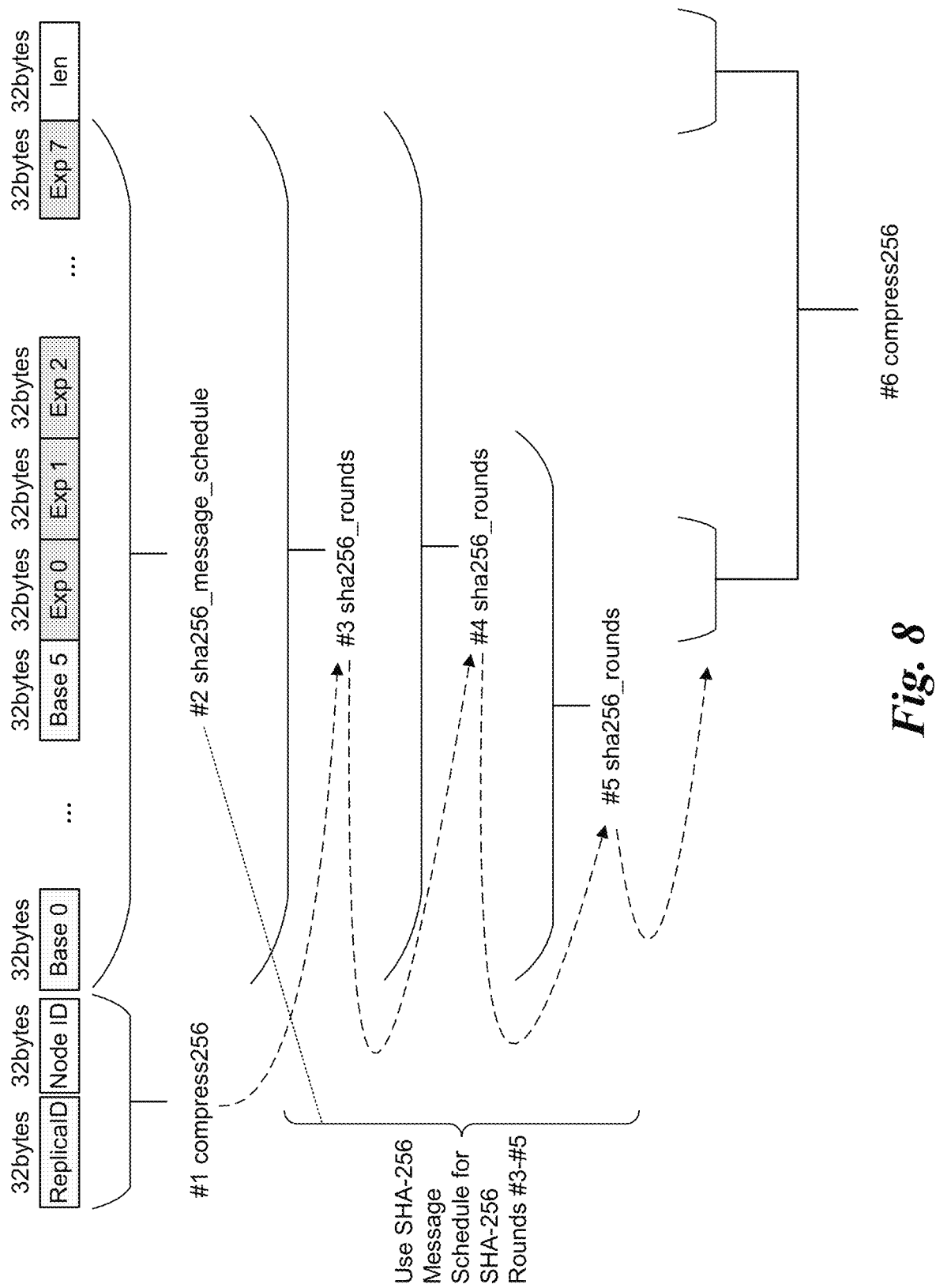
FIG. 8 is a diagram illustrating a novel scheme for calculating a new "all parents" Filecoin node, according to one embodiment.

By generating the SHA-256 message schedule separately (and only once), the scheme for generating a new Filecoin node in FIG. 8 employs less computations than the conventional approach in FIG. 7. Efficiency can be further improved by using the message schedule generation scheme illustrated in FIG. 5 or the pseudocode in FIG. 6 to generate the message schedule for multiple rounds in parallel.

Figure 9:
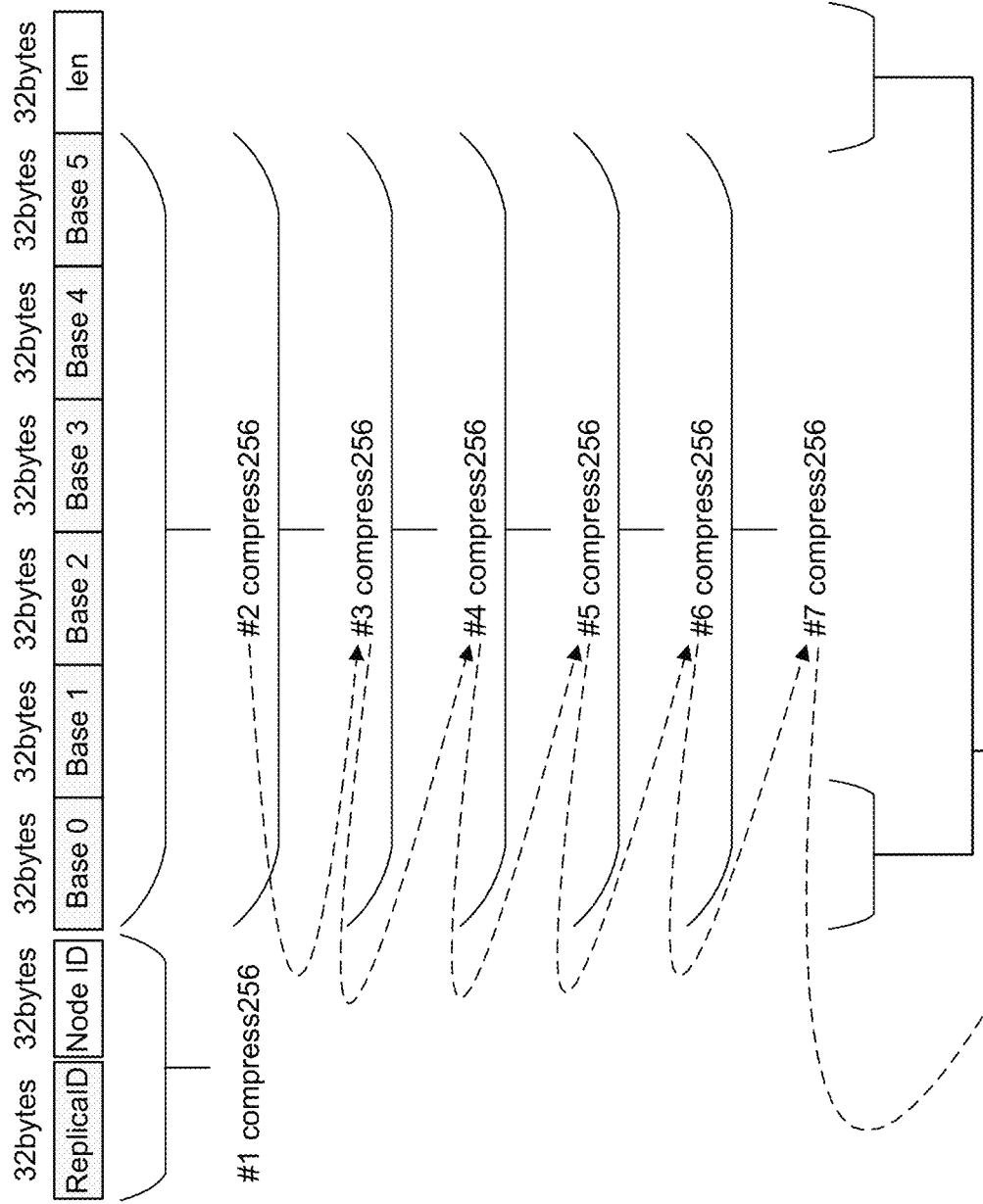
FIG. 9 is a diagram illustrating a conventional scheme for calculating a new Filecoin node derived from a set of base parents.
Figure 10:
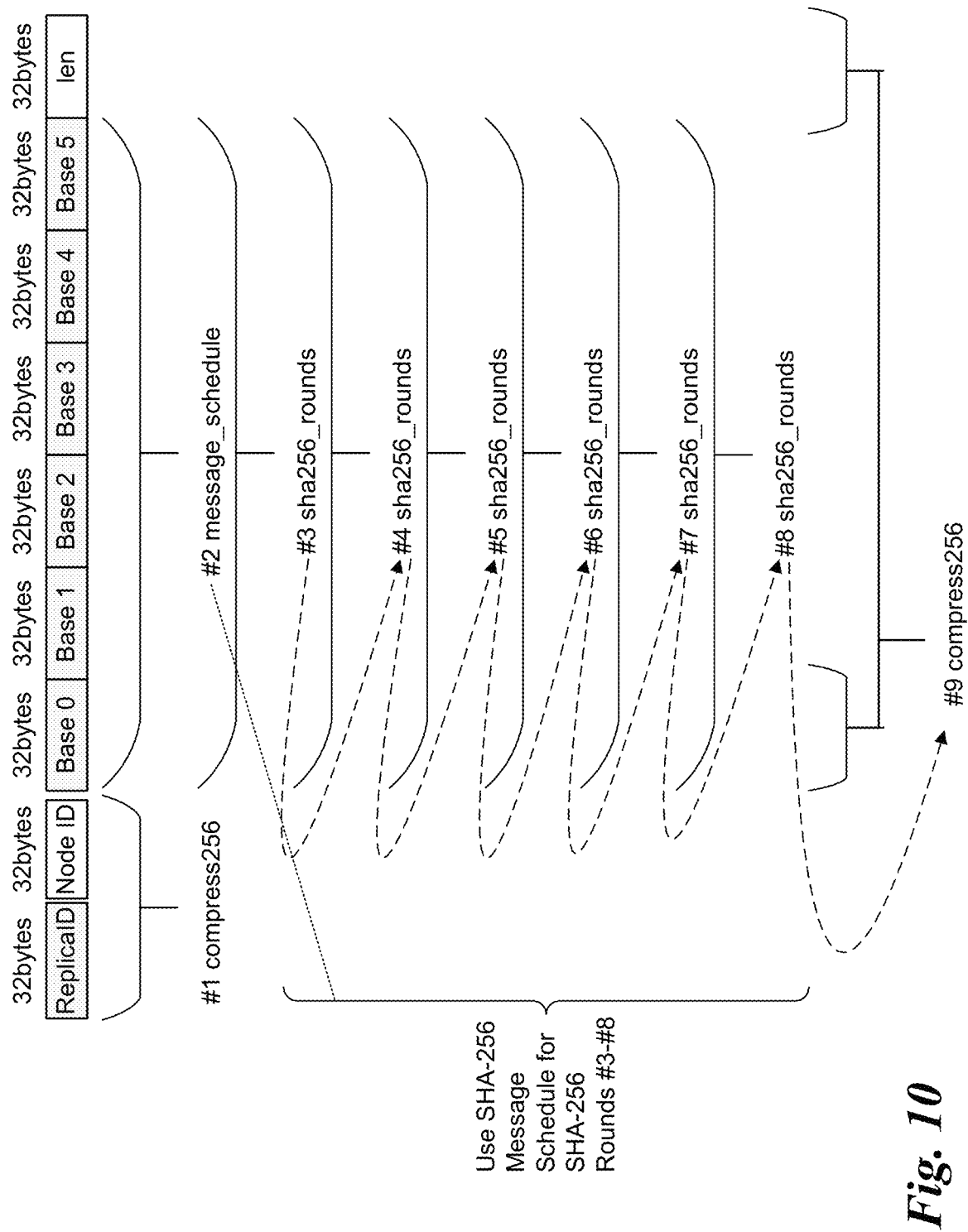
FIG. 10 is a diagram illustrating a novel scheme for calculating a new Filecoin node derived from a set of base parents.

As shown in FIGS. 9 and 10, the novel SHA-256 message schedule scheme can also be applied to base parents to compute a new node. As shown under the convention approach in FIG. 9, eight conventional SHA-256 computations are used for compress256 operations #1-#8. #1 compress256 operates on the ReplicaID and NodeID blocks. compress256 operations #2-#7 operate on six Base parent blocks Base 0, Base 1, Base 2, Base 3, Base 4, and Base 5. #8 compress256 operates on the Base 0 and the len blocks.

The improved scheme is shown in FIG. 10. #1 compress256 operation is the same under both schemes. The novel #2 SHA-256 message schedule operation is used to generate an SHA-256 message schedule for the six Base parent blocks (Base 0, Base 1 . . . Base 5), and is used for SHA-256 rounds in operations #3-#8. #9 compress256 operation is the same as #8 compress256 operation in FIG. 9 and employs the conventional SHA-256 algorithm. As before, the novel scheme in FIG. 10 employs less computations than the convention approach in FIG. 9.

The solutions disclosed herein can be implemented in several different ways depending on underlying hardware architecture. For example, the #2 sha256_message_schedule may be implemented as a separate SIMD function creating a message schedule for multiple data blocks in parallel, as described and illustrated above. As on option, #2 sha256_message_schedule could be also combined/stitched together with #1 compress256.

Multi-Buffer Scheme with SHA Instruction Extensions

Figure 11:
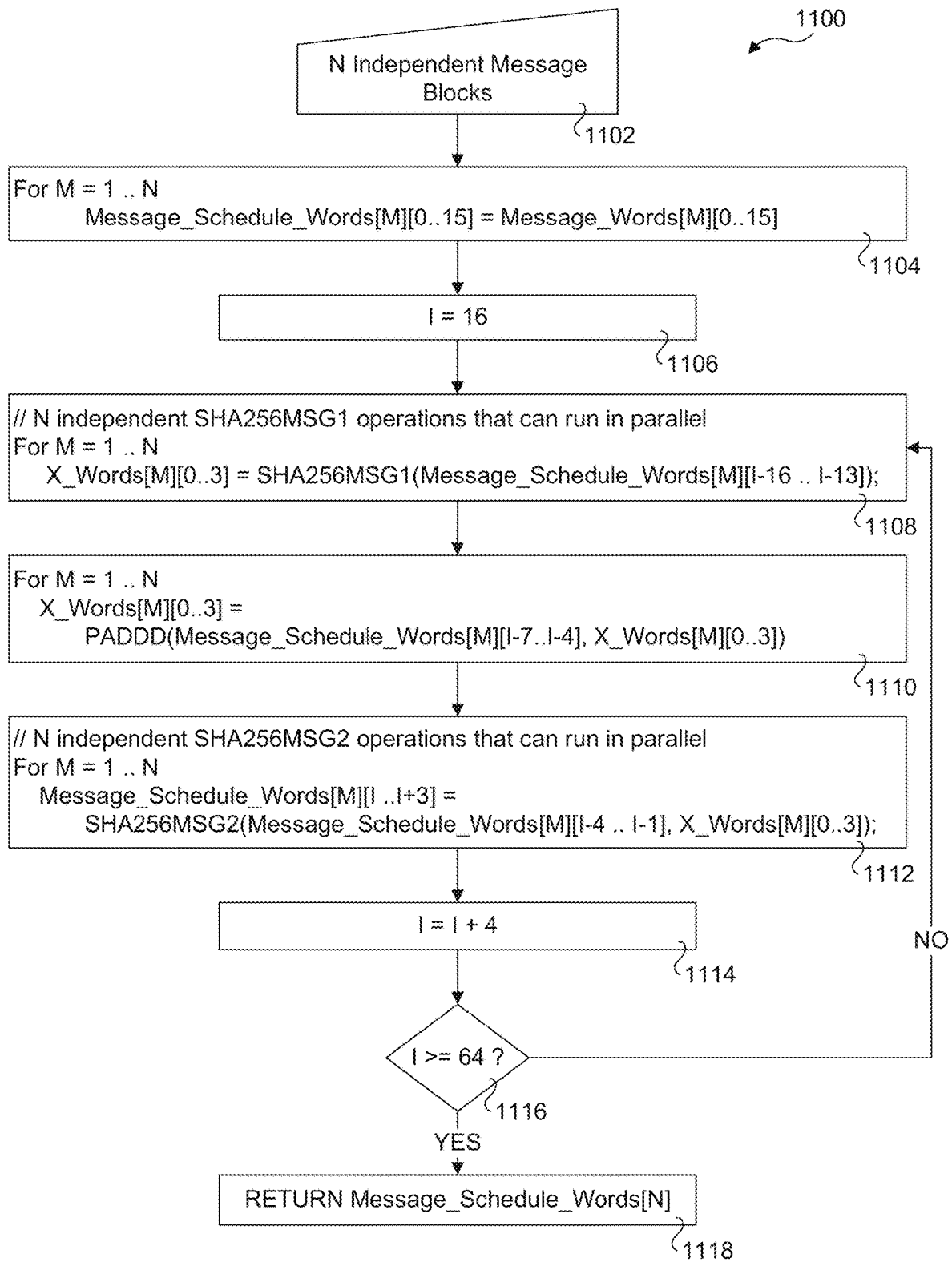
FIG. 11 is a flowchart illustrating a multiple-buffer scheme employing SHA instruction extensions for creating message schedules for multiple data blocks in parallel.

Under another approach described below with reference to FIG. 11, the #2 sha256_message_schedule may be implemented as a separate function creating a message schedule for multiple data blocks in parallel with use of SHA instruction extensions. As an option, operations #2 and #3 could be combined/stitched together and the message schedule preserved for the subsequent operations #4, #5, #6, #7 and #8. As yet another option, the separate SHA-256 message schedule operation could also be applied to SHA-256 rounds operations employed by #1 compress256 and #9 compress256 to create a message schedule for whole message in one operation.

In one embodiment, a multi-buffer scheme is provided that creates a message schedule for multiple blocks in parallel using SHA instruction extensions (also called SHANI instructions). Intel® Corporation introduced SHA instruction extensions for its x86 instruction set architecture (ISA) that support hardware acceleration of SHA operations. The SHA instruction extensions include SHA256MSG1 and SHA256MSG2 instructions. The SHA256MSG1 instruction performs an intermediate calculation for the next four SHA256 message dwords. The SHA256MSG2 instruction performs a final calculation for the next four SHA256 message dwords.

Depending on micro architectural implementation of SHANI instructions a multi-buffer scheme may be considered for improved compute efficiency. Namely, if execution of SHA256MSG1 and SHA256MSG2 instructions on independent data fragments can overlap then it may be beneficial to operate on a few data blocks in parallel. In short, execution of N independent instructions is faster than executing N dependent instructions.

With reference to a flowchart 1100 in FIG. 11, one embodiment of the multi-buffer scheme with SHA instruction extensions operates as follows. The process begins with an input 1102 of N independent message blocks. Generally, parameter N should be adjusted for a given micro architecture considering latency and throughput of the instructions of interest. In a block 1104 a loop over the N message blocks is implemented to insert the Message_Words[M][0 . . . 15] into the Message_Schedule_Words[M][0 . . . 15]. I is then set to 16 in a block 1106. In repeated blocks 1108, 1110, 1112, 1114 and 1116 the remaining 48 message words get generated for N independent message blocks producing four 32-bit words of message schedule in one iteration.

In block 1108 N SHA256MSG1 independent instructions are issued. This depends on previously computed messages schedule words indexes i−16, i−15, . . . i−13. Temporary 4 32-bit words per message block are result of 1108 (X_Words). As shown a loop over the N message blocks is performed to update the next four SHA256 message dewords (X_Words[M][0 . . . 3]) using the SHA256MSG1 instruction, where the N SHA256MSG1 operations are performed in parallel.

In block 1110, temporary four 32-bit X_Words are added with previously computed message schedule words indexes i−7, i−6, . . . i−4. The result is stored in X_Words. This is performed by looping over the N message blocks for Message_Schedule_Words[M][I−7 . . . I−4] with the result stored in X_Words[M][0 . . . 3].

In block 1112 N SHA256MSG2 independent instructions are issued to finalize compute of four 32-bit message schedule words indexes i, i+1, . . . i+3. The input data to this operation is four 32-bit X_Words and message schedule words indexes i−4, i−3, . . . i−1. As illustrated a loop over the N message blocks is performed to update the next four SHA256 message schedule dewords (Message_Schedule_Words[M][I . . . I+3]) using the SHA256MSG2 instruction, where the N SHA256MSG2 operations are performed in parallel.

In a block 1114, I is incremented by 4, followed by a check in a decision block 1116 to determine whether I>=64. If not (answer is NO), the logic loops back to repeat the operations in blocks 1108, 1110, and 1012 for the next four SHA256 message dwords. These operations are repeated 13 times, with the final result returned as a Message_Schedule_Words[N] data structure in a block 1118.

In accordance with another aspect of the multiple-buffer scheme, N is adjusted such that the latency throughput properties of the SHA256MSG1 and SHA256MSG2 operations provide maximize architecture throughput.

Example Platform/Server

Figure 12:
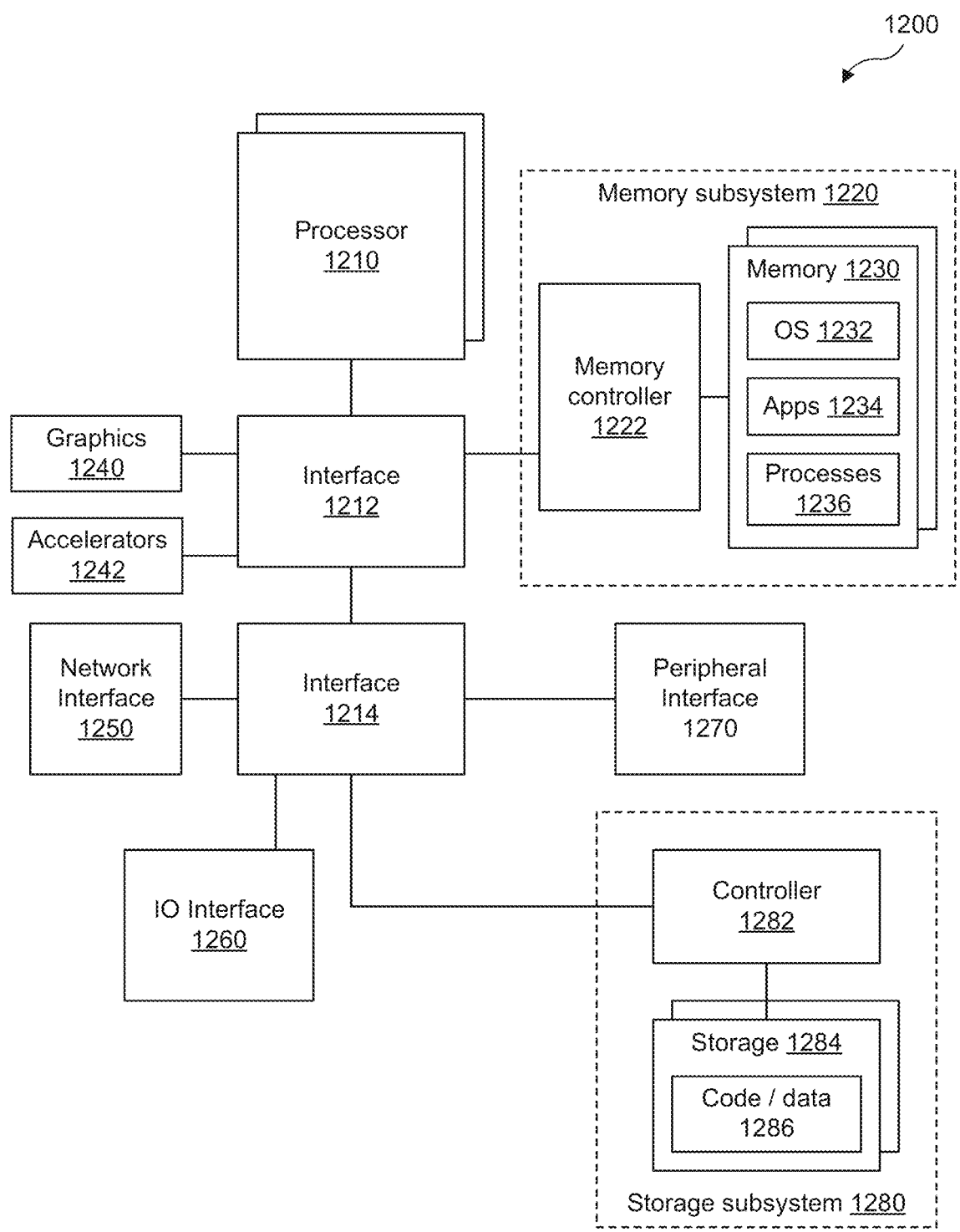
FIG. 12 is a diagram of a compute platform or server that may be used to implement aspects of the embodiments described and illustrated herein.

FIG. 12 depicts a compute platform 1200 such as a server, compute node, or similar computing system in which aspects of the embodiments disclosed above may be implemented. Compute platform 1200 includes one or more processors 1210, which provides processing, operation management, and execution of instructions for compute platform 1200. Processor 1210 can include any type of microprocessor, central processing unit (CPU), graphics processing unit (GPU), processing core, multi-core processor or other processing hardware to provide processing for compute platform 1200, or a combination of processors. Processor 1210 controls the overall operation of compute platform 1200, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In some embodiments, processing may be split between a CPU and a GPU. For example, it is common to implement TensorFlow on compute platforms including a CPU and a GPU. In some embodiments the CPU and GPU are separate components. In other embodiments, a CPU and GPU may be implemented in a System on a Chip (SoC) or in a multi-chip module or the like.

In one example, compute platform 1200 includes interface 1212 coupled to processor 1210, which can represent a higher speed interface or a high throughput interface for system components that needs higher bandwidth connections, such as memory subsystem 1220 or optional graphics interface components 1240, or optional accelerators 1242. Interface 1212 represents an interface circuit, which can be a standalone component or integrated onto a processor die. Where present, graphics interface 1240 interfaces to graphics components for providing a visual display to a user of compute platform 1200. In one example, graphics interface 1240 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1240 generates a display based on data stored in memory 1230 or based on operations executed by processor 1210 or both. In one example, graphics interface 1240 generates a display based on data stored in memory 1230 or based on operations executed by processor 1210 or both.

In some embodiments, accelerators 1242 can be a fixed function offload engine that can be accessed or used by a processor 1210. For example, an accelerator among accelerators 1242 can provide data compression capability, cryptography services such as public key encryption (PKE), cipher, hash/authentication capabilities, decryption, or other capabilities or services. In some embodiments, in addition or alternatively, an accelerator among accelerators 1242 provides field select controller capabilities as described herein. In some cases, accelerators 1242 can be integrated into a CPU socket (e.g., a connector to a motherboard or circuit board that includes a CPU and provides an electrical interface with the CPU). For example, accelerators 1242 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1242 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1220 represents the main memory of compute platform 1200 and provides storage for code to be executed by processor 1210, or data values to be used in executing a routine. Memory subsystem 1220 can include one or more memory devices 1230 such as read-only memory (ROM), flash memory, one or more varieties of random access memory (RAM) such as DRAM, or other memory devices, or a combination of such devices. Memory 1230 stores and hosts, among other things, operating system (OS) 1232 to provide a software platform for execution of instructions in compute platform 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for compute platform 1200. In one example, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210.

While not specifically illustrated, it will be understood that compute platform 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, compute platform 1200 includes interface 1214, which can be coupled to interface 1212. In one example, interface 1214 represents an interface circuit, which can include standalone components and integrated circuitry. In one example, multiple user interface components or peripheral components, or both, couple to interface 1214. Network interface 1250 provides compute platform 1200 the ability to communicate with remote devices (e.g., servers or other computing devices) over one or more networks. Network interface 1250 can include an Ethernet adapter, wireless interconnection components, cellular network interconnection components, USB (universal serial bus), or other wired or wireless standards-based or proprietary interfaces. Network interface 1250 can transmit data to a device that is in the same data center or rack or a remote device, which can include sending data stored in memory. Network interface 1250 can receive data from a remote device, which can include storing received data into memory. Various embodiments can be used in connection with network interface 1250, processor 1210, and memory subsystem 1220.

In one example, compute platform 1200 includes one or more IO interface(s) 1260. IO interface 1260 can include one or more interface components through which a user interacts with compute platform 1200 (e.g., audio, alphanumeric, tactile/touch, or other interfacing). Peripheral interface 1270 can include any hardware interface not specifically mentioned above. Peripherals refer generally to devices that connect dependently to compute platform 1200. A dependent connection is one where compute platform 1200 provides the software platform or hardware platform or both on which operation executes, and with which a user interacts.

In one example, compute platform 1200 includes storage subsystem 1280 to store data in a nonvolatile manner. In one example, in certain system implementations, at least certain components of storage 1280 can overlap with components of memory subsystem 1220. Storage subsystem 1280 includes storage device(s) 1284, which can be or include any conventional medium for storing large amounts of data in a nonvolatile manner, such as one or more magnetic, solid state, or optical based disks, or a combination. Storage 1284 holds code or instructions and data 1286 in a persistent state (e.g., the value is retained despite interruption of power to compute platform 1200). Storage 1284 can be generically considered to be a "memory," although memory 1230 is typically the executing or operating memory to provide instructions to processor 1210. Whereas storage 1284 is nonvolatile, memory 1230 can include volatile memory (e.g., the value or state of the data is indeterminate if power is interrupted to compute platform 1200). In one example, storage subsystem 1280 includes controller 1282 to interface with storage 1284. In one example controller 1282 is a physical part of interface 1214 or processor 1210 or can include circuits or logic in both processor 1210 and interface 1214.

Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5), LPDDR5, HBM2E, HBM3, and HBM-PIM, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In an example, compute platform 1200 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

In addition to systems with CPUs, the teaching and principles disclosed herein may be applied to Other Processing Units (collectively termed XPUs) including one or more of Graphic Processor Units (GPUs) or General Purpose GPUs (GP-GPUs), Tensor Processing Units (TPUs), Data Processor Units (DPUs), Infrastructure Processing Units (IPUs), Artificial Intelligence (AI) processors or AI inference units and/or other accelerators, FPGAs and/or other programmable logic (used for compute purposes), etc. While some of the diagrams herein show the use of CPUs, this is merely exemplary and non-limiting. Generally, any type of XPU may be used in place of a CPU in the illustrated embodiments. Moreover, as used in the following claims, the term "processor" is used to generically cover CPUs and various forms of XPUs.

In some embodiments, processor 1210 includes an instruction set architecture (ISA) that supports the SIMD instructions described and illustrated herein. In some embodiments, the ISA of processor 1210 employ instructions with the SHA extensions described and illustrated herein.

In the foregoing description, the embodiments are implemented using SHA-2 algorithms. However, this is meant to be exemplary and non-limiting, as the principles and teachings disclosed herein may be applied to other hashing algorithms, either currently in existence or yet to be specified.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'm', 'n', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for generating a hash for a data item, comprising:
   splitting the data item into a plurality of chunks having a fixed size;
   generating an SHA-2 (Secure Hash Algorithm 2) message schedule by,
   for at least one chunk,
      partitioning the data in the chunk into a plurality of message words;
      for multiple Single Instruction Multiple Data (SIMD) registers, copying message words into the SIMD register; and
      executing a plurality of SIMD instructions using the SIMD registers to output message schedules for message words in parallel; and
   employing the SHA-2 message schedule for computing a plurality of SHA-2 rounds, each compressing two or more chunks, to generate a hash.

2. The method of claim 1, wherein operations for generating the SHA-2 message schedule are performed only once as a group.

3. The method of claim 1, further comprising executing SHA256 instruction extensions to create a SHA-2 message schedule for multiple message words in parallel.

4. The method of claim 1, wherein n-bit chunks comprise 32-bit chunks, the SHA-2 message schedule comprises an SHA-256 message schedule and the SHA-2 rounds are SHA-256 rounds.

5. The method of claim 1, wherein n-bit chunks comprise 64-bit chunks, the SHA-2 message schedule comprises an SHA-512 message schedule and the SHA-2 rounds are SHA-512 rounds.

6. The method of claim 1, wherein the SHA-2 message schedule is an SHA-256 message schedule, and wherein the SHA-256 message schedule is employed for compressing multiple chunks using multiple SHA-256 rounds in conjunction with generating a new distributed storage network node.

7. The method of claim 6, wherein generating the new distributed storage network node includes: generating a SHA-256 message schedule to be applied for compressing data comprising six base blocks Base 0, Base 1, Base 2, Base 3, Base 4, and Base 5 and eight expansion blocks Exp 0, Exp 1, Exp 2, Exp 3, Exp 4, Exp 5, Exp 6, and Exp 7; and employing the SHA-256 message schedule for at least two SHA-256 rounds to compress data in the six base blocks and the eight expansion blocks.

8. The method of claim 6, wherein generating the new distributed storage network node includes: generating a SHA-256 message schedule to be applied for compressing data comprising six base blocks Base 0, Base 1, Base 2, Base 3, Base 4, and Base 5; and employing the SHA-256 message schedule for at least two SHA-256 rounds to compress data in the six base blocks.

9. The method of claim 1, wherein the SHA-2 message schedule is generated by,
   for each of multiple chunks,
      partitioning the data in the chunk into a plurality of message words;
      for multiple Single Instruction Multiple Data (SIMD) registers, copying message words into the SIMD register; and
      executing a plurality of SIMD instructions using the SIMD registers to output message schedules for message words in parallel.

10. A non-transitory machine-readable medium having instructions stored thereon to be executed on one or more processors in a computer system, at least one of the processors having an instruction set architecture (ISA) including one or more Single Instruction Multiple Data (SIMD) instructions and including a plurality of SIMD registers, to enable the computer system to:
    split the data item into a plurality of chunks having a fixed size;
    generate a message schedule by,
    for at least one chunk,
       partition the data in the chunk into a plurality of data blocks;
       for each of multiple SIMD registers, copy message words from different data blocks into the SIMD register; and
       execute a plurality of SIMD instructions using the SIMD registers to output message schedules for message words in parallel, wherein the plurality of SIMD instructions comprise instances of one or more of the SIMD instructions in the ISA; and
    employ the message schedule for computing a plurality of rounds, each compressing two or more chunks, to generate a hash.

11. The non-transitory machine-readable medium of claim 10, further comprising instructions which, when executed on a processor enable the computer system to:
    perform pre-processing on the data item including adding zero of more padding bits and a length such that an overall length of the pre-processed data item is an integer multiple of n-bits; and
    split the pre-processed data item into a plurality of n-bit chunks.

12. The non-transitory machine-readable medium of claim 10, wherein the instructions include SHA256 instruction extensions that, when executed on the processor, enable the computer system to create a message schedule for multiple of the plurality of data blocks in parallel.

13. The non-transitory machine-readable medium of claim 10, wherein execution of the software instructions generates the SHA-2 message schedule by,
    for each of multiple chunks,
       partition the data in the chunk into a plurality of message words;

for multiple Single Instruction Multiple Data (SIMD) registers, copy message words into the SIMD register; and execute a plurality of SIMD instructions using the SIMD registers to output message schedules for message words in parallel.

14. A computer system comprising:

memory, in which a plurality of software instructions are loaded or stored; and one or more processors, operatively coupled to the memory, including a processor with an instruction set architecture (ISA) including one or more Single Instruction Multiple Data (SIMD) instructions and a plurality of SIMD registers, wherein execution of the software instructions on the one or more processors enables the computing system to, split the data item into a plurality of chunks having a fixed size;

generate an SHA-2 (Secure Hash Algorithm 2) message schedule by, for at least one chunk, partition the data in the chunk into a plurality of data blocks;

for each of multiple SIMD registers, copy message words from different data blocks into the SIMD register; and execute a plurality of SIMD instructions using the SIMD registers to output message schedules for message words in parallel, wherein the plurality of SIMD instructions comprise instances of one or more of the SIMD instructions in the ISA; and employ the SHA-2 message schedule for computing a plurality of SHA-2 rounds, each compressing two or more chunks, to generate a hash.

15. The computer system of claim 14, wherein a portion of the software instructions comprise SHA extensions instruction extensions, and wherein execution of the software instructions on the one or more processors enables the computing system to generate message schedules for multiple of the plurality of message words in parallel.

16. The computer system of claim 14, wherein the SHA-2 message schedule is an SHA-256 message schedule, wherein execution of the software instructions on the one or more processors further enables the computer system to employ the SHA-256 message schedule to generate a new distributed storage network node, and wherein the SHA-256 message schedule is employed for compressing multiple chunks using multiple SHA-256 rounds.

17. The computer system of claim 14, wherein execution of the software instructions generates the SHA-2 message schedule by, for each of multiple chunks, partition the data in the chunk into a plurality of message words;

for multiple Single Instruction Multiple Data (SIMD) registers, copy message words into the SIMD register; and execute a plurality of SIMD instructions using the SIMD registers to output message schedules for message words in parallel.

* * * * *